United States Patent
Kim et al.

(10) Patent No.: US 9,532,243 B2
(45) Date of Patent: Dec. 27, 2016

(54) WLAN AND LTE COEXISTENCE IN UNLICENSED RADIO FREQUENCY BANDS

(71) Applicant: Apple Inc., Cupertino, CA (US)

(72) Inventors: Joonsuk Kim, Saratoga, CA (US); Yong Liu, Campbell, CA (US); Harish Ramamurthy, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 26 days.

(21) Appl. No.: 14/502,790

(22) Filed: Sep. 30, 2014

(65) Prior Publication Data

US 2015/0208253 A1    Jul. 23, 2015

Related U.S. Application Data (60) Provisional application No. 61/929,333, filed on Jan. 20, 2014.

(51) Int. Cl.
| | |
|---|---|
| *H04L 12/26* | (2006.01) |
| *H04W 24/02* | (2009.01) |
| *H04W 16/14* | (2009.01) |
| *H04L 27/26* | (2006.01) |
| *H04L 27/00* | (2006.01) |
| *H04L 5/00* | (2006.01) |
| *H04W 74/08* | (2009.01) |

(52) U.S. Cl.
CPC .......... *H04W 24/02* (2013.01); *H04L 27/0006* (2013.01); *H04L 27/2614* (2013.01); *H04W 16/14* (2013.01); *H04L 5/001* (2013.01); *H04W 74/0808* (2013.01)

(58) Field of Classification Search
None
See application file for complete search history.

(56) References Cited

U.S. PATENT DOCUMENTS

| | | | |
|---|---|---|---|
| 7,020,116 B1 * | 3/2006 | Nakada | H04L 27/2662 370/338 |
| 8,787,836 B1 * | 7/2014 | Carbajal | H04W 24/08 455/67.11 |
| 2004/0076246 A1 * | 4/2004 | Vanderperren | H04L 27/2675 375/343 |
| 2008/0175337 A1 * | 7/2008 | Cheng | H04L 7/042 375/317 |

* cited by examiner

*Primary Examiner* — Nicholas Sloms
(74) *Attorney, Agent, or Firm* — Downey Brand LLP (57) ABSTRACT

A wireless local area network (WLAN) device processes received samples for a radio frequency channel in an unlicensed radio frequency band to detect radio frequency interference from a long term evolution (LTE) wireless communication system. The WLAN device performs a correlation of received time-domain samples to detect the presence of a cyclic prefix for an orthogonal frequency division multiplexing (OFDM) symbol used by the LTE wireless communication system. The WLAN device searches for cross-correlation peaks (1) that exceed a peak power threshold value, (2) that a ratio of which exceed a ratio threshold, and (3) that are separated by a time period corresponding to the OFDM symbol. The WLAN device detects the presence of the LTE wireless communication system without decoding the OFDM symbols.

20 Claims, 8 Drawing Sheets

WLAN AND LTE COEXISTENCE IN UNLICENSED RADIO FREQUENCY BANDS

CROSS REFERENCE TO RELATED APPLICATIONS

This application claims the benefit of U.S. Provisional Application No. 61/929,333, filed Jan. 20, 2014 and entitled "WLAN AND LTE COEXISTENCE IN UNLICENSED FREQUENCY BANDS", which is incorporated by reference herein in its entirety for all purposes.

FIELD

The described embodiments generally relate to wireless communication technology, and more particularly to detection and mitigation of radio frequency interference generated by cellular Long Term Evolution (LTE) systems and received by wireless local area network devices.

BACKGROUND

Wireless networks are encountering exponential growth of Internet traffic, such as video traffic, web browsing traffic, and other data traffic that can be carried over the Internet. Continued growth in Internet traffic has spurred the development of new wireless communication protocols that can support wider bandwidths, a greater range of radio frequencies, and higher throughput data rates. Given the costs and/or data traffic limits to communicate over cellular networks, users can prefer to communicate over "free" wireless local area networks (WLANs), subscription based WLANs, and/or operator provided WLANs. WLAN access is typically not predicated on usage based billing, so users can generally use WLANs without worrying about exceeding a data traffic cap. In unlicensed radio frequency bands, in which WLANs typically operate, cellular wireless communication devices do not presently operate, but standardization efforts and exploration have begun that seek to add bandwidth for cellular transmissions by using radio frequency channels within the unlicensed radio frequency bands presently occupied by WLANs. In particular, the 5 GHz radio frequency band is targeted to provide for secondary carrier LTE transmission in a carrier aggregation mode. To maintain WLAN performance, a WLAN system needs to be able to detect and mitigate the effects of radio frequency interference from cellular communication systems that may overlap with WLAN signals.

SUMMARY

Wireless communication devices that can operate on both cellular networks and WLANs are typically configured to communicate data traffic over a WLAN when available, even when both WLAN radios and cellular radios are simultaneously active. Wireless access points and wireless client (mobile station) devices can support communication via multiple wireless local area network communication protocols that use different radio frequency bands in parallel, with multiple different radio frequency channels of varying bandwidths available for use in different radio frequency bands, including "unlicensed" radio frequency bands. Flexible use of different radio frequency channels in different radio frequency bands in parallel by WLAN devices require an effective detection of radio frequency interference from various external communication systems, including LTE or other cellular systems that may transmit overlapping radio frequency signals. When no or minimal overlapping radio frequency signals are detected, the wireless communication device can select a radio frequency channel for communication; however, when other wireless communication devices, whether WLAN, cellular, or multi-mode devices communicate using the same frequency channel(s) in the same frequency band, the wireless communication device can apply coexistence interference mitigation techniques to avoid and/or compensate for the radio frequency interference that can occur in the shared radio frequency channel.

A WLAN device performs a correlation of time windows (segments) of received radio frequency signals in a radio frequency channel to determine whether an LTE system occupies the same radio frequency channel. The WLAN device performs the correlation during a radio frequency scanning procedure, e.g., in order to determine a radio frequency channel on which to associate with an access point, or as part of an extension to a CSMA mechanism to avoid simultaneous transmission and/or reception in a shared radio frequency channel. When an LTE cellular system uses a subset of radio frequency channels within a radio frequency band, the WLAN device detects the LTE cellular system's presence and switches to another radio frequency channel in the radio frequency band, which can be free from radio frequency interference from the LTE cellular system. When the LTE cellular system occupies any of the radio frequency channels in the radio frequency band, the WLAN device detects the presence of active cellular transmissions in the radio frequency channel and either switches to another radio frequency channel, that may be unoccupied or less occupied, or waits for a period of time and listens again before attempting to communicate using the presently occupied radio frequency channel. In some embodiments, the WLAN device uses an energy detection mechanism to detect relatively high levels of radio frequency interference, e.g., at or above $-62$ dBm power levels, from any wireless system that shares one or more radio frequency channels in the unlicensed radio frequency band. The WLAN device uses a correlation mechanism to detect relatively lower levels of radio frequency interference from LTE cellular systems, e.g., at levels approximately 5-10 dB or more above a noise plus interference level observed by the WLAN device, e.g., at a power level ranging from approximately $-85$ to $-65$ dBm or higher. The correlation mechanism exploits the structure of LTE cellular system transmissions to detect their presence, without requiring the WLAN device to decode the LTE signals. Using a combination of the energy detection and correlation mechanisms the WLAN device can reduce the occurrence of collisions between LTE signals and WLAN packets, thereby providing for clearer transmission for both the LTE systems and the WLAN systems.

This Summary is provided merely for purposes of summarizing some example embodiments, so as to provide a basic understanding of some aspects of the subject matter described herein. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

Wireless local area networks provide communication between a set of client devices and an access point (or in an "ad hoc" peer-to-peer mode with each other without a dedicated access point) to form a basic service set (BSS). In a BSS, as defined for an 802.11 wireless local area network, e.g., a Wi-Fi network, a unique BSS identifier (BSSID) can be used, and all client devices associated with the access point can communicate with the access point (or with each other) using a common radio frequency channel. The radio frequency channel used by the access point and client devices can change over time, e.g., to account for variations in radio frequency channel conditions including signal strength and radio frequency interference. A client device and/or the access point can monitor one or more radio frequency channels in one or more radio frequency bands to determine an appropriate radio frequency channel on which to communicate. A client device can be associated with the access point on a radio frequency channel, and before attempting to transmit on the radio frequency channel, the access point and/or the client device can listen for other nearby wireless communication devices that may already occupy the radio frequency channel using a procedure known as "carrier sense multiple access." The term "carrier sense" can refer to a WLAN device (client or AP) detecting and/or decoding a preamble of a WLAN packet transmitted in the radio frequency channel being "sensed" or "scanned" by the WLAN device. When another client device or the access point is already using the radio frequency channel, the listening wireless communication device can "back off" for a random time interval before listening again to determine whether the radio frequency channel is available for communication by the wireless communication device. Cellular communication systems operate based on a schedule of radio resources assigned by a network element, e.g. an evolved Node B (or other comparable base station system), and can share a set of radio frequency channels among many wireless communication devices quite efficiently. Wireless communication devices for which parallel radio resources are not scheduled, e.g., a WLAN client device and/or access point that uses radio frequency channels that overlap with the cellular communication systems, can transmit effectively when radio frequency interference is low (e.g., at or below a noise floor level) and/or absent (e.g., during time periods between cellular communications). Recently, wireless communication standardization bodies, e.g., the Third Generation Partnership Project (3GPP) standardization group, which drafts, ratifies, and publishes wireless cellular communication protocols, including LTE and LTE-Advanced wireless communication protocols, has approved a study group to investigate extending the usage of LTE technology into unlicensed radio frequency bands, in particular the 5 GHz unlicensed band. Multiple generations of WLAN systems and wireless personal area network (WPAN) systems use the 2.4 GHz and 5 GHz unlicensed radio frequency bands for communication and may be significantly impacted by radio frequency interference generated by proposed LTE signals that may occupy 10 MHz wide and/or 20 MHz wide radio frequency channels that overlap with existing WLAN and/or WPAN radio frequency channels.

In some embodiments, a WLAN client device and/or a WLAN access point can perform a correlation of time windows (segments) of received radio frequency signals in a radio frequency channel to determine whether an LTE system occupies the same radio frequency channel. The WLAN client device can perform the correlation in conjunction with a radio frequency scanning procedure, e.g., in order to determine a radio frequency channel on which to associate with an access point, or as part of an extension to a CSMA mechanism to avoid simultaneous transmission and/or reception in a radio frequency channel shared with an LTE system. When an LTE cellular system uses a subset of radio frequency channels within a radio frequency band, the WLAN client device and/or the WLAN access point can detect the LTE cellular system's presence and switch to another radio frequency channel in the radio frequency band, which can be free from radio frequency interference from the LTE cellular system. When the LTE cellular system occupies any of the radio frequency channels in the radio frequency band, the WLAN client device and/or the WLAN access point can detect the presence of active cellular transmissions in the radio frequency channel and can either switch to another radio frequency channel, that may be unoccupied or less occupied, or can wait for a period of time and listen again before attempting to communicate using the presently occupied radio frequency channel.

The WLAN client device and/or WLAN access point can use different mechanisms to detect the presence of an interfering system based on a level of radio frequency interference present in one or more radio frequency channels being assessed, e.g., using an energy detection mechanism to identify higher levels of radio frequency interference and using a correlation mechanism to identify lower levels of radio frequency interference, e.g., at or above a noise threshold level but below a level for the energy detection mechanism. The WLAN client device and/or WLAN access point, in some embodiments, can use an energy detection mechanism to detect relatively high levels of radio frequency interference, e.g., at or above −62 dBm power levels, from any wireless system, including LTE cellular systems, that share the radio frequency channels in the unlicensed radio frequency band. The WLAN client device and/or WLAN access point, in some embodiments, can use a correlation mechanism to detect relatively lower levels of radio frequency interference from LTE cellular systems, e.g., at levels approximately 5-10 dB or more above a noise plus interference level observed by the WLAN device. A representative noise floor in a WLAN client device and/or a WLAN access point can be at a power level of approximately −90 to −95 dBm, and the WLAN client device and/or the WLAN access point can detect the presence of a cellular LTE system in the radio frequency channel at a power level ranging from approximately −85 to −65 dBm or higher. The correlation mechanism can exploit the structure of the LTE cellular system transmissions to detect their presence, without requiring the WLAN client device and/or WLAN access point to decode the LTE signals. Using the described detection mechanism, the WLAN client device and/or WLAN access point can detect the presence of LTE signals in overlapping radio frequency channels and can reduce the occurrence of collisions between LTE signals and WLAN packets, thereby providing for clearer transmission for both the LTE systems and the WLAN systems in shared radio frequency bands. A WLAN access point that detects the presence of LTE signals in one or more radio frequency channels can avoid the use of such radio frequency channels, e.g., for an extended period of time and/or for a random period of time, or until determining that the radio frequency channel is "free" from radio frequency interference from one or more LTE systems.

In accordance with various embodiments described herein, the terms "wireless communication device," "wireless device," "mobile device," "mobile station," and "user equipment" (UE) may be used interchangeably herein to describe one or more common consumer electronic devices that may be capable of performing procedures associated with various embodiments of the disclosure. In accordance with various implementations, any one of these consumer electronic devices may relate to: a cellular phone or a smart phone, a tablet computer, a laptop computer, a notebook computer, a personal computer, a netbook computer, a media player device, an electronic book device, a MiFi® device, a wearable computing device, as well as any other type of electronic computing device having wireless communication capability that can include communication via one or more wireless communication protocols such as used for communication on: a wireless wide area network (WWAN), a wireless metro area network (WMAN) a wireless local area network (WLAN), a wireless personal area network (WPAN), a near field communication (NFC), a cellular wireless network, a fourth generation (4G) LTE, LTE Advanced (LTE-A), and/or 5G or other present or future developed advanced cellular wireless networks. The wireless communication device, in some embodiments, can also operate as part of a wireless communication system, which can include a set of client devices, which can also be referred to as stations, client wireless devices, or client wireless communication devices, interconnected to an access point (AP), e.g., as part of a WLAN, and/or to each other, e.g., as part of a WPAN and/or an "ad hoc" wireless network. In some embodiments, the client device can be any wireless communication device that is capable of communicating via a WLAN technology, e.g., in accordance with a wireless local area network communication protocol. In some embodiments, the WLAN technology can include a Wi-Fi (or more generically a WLAN) wireless communication subsystem or radio, the Wi-Fi radio can implement an Institute of Electrical and Electronics Engineers (IEEE) 802.11 technology, such as one or more of: IEEE 802.11a; IEEE 802.11b; IEEE 802.11g; IEEE 802.11-2007; IEEE 802.11n; IEEE 802.11-2012; IEEE 802.11ac; or other present or future developed IEEE 802.11 technologies.

Figure 1A:
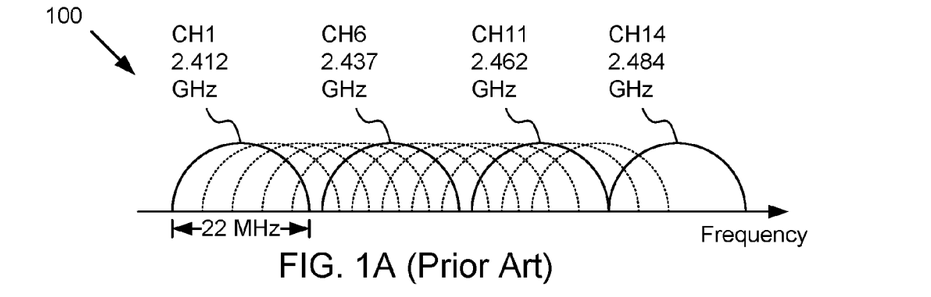
FIG. 1A to FIG. 1E illustrate representative sets of parallel radio frequency channels for use in different unlicensed radio frequency bands by a wireless communication system in accordance with some embodiments.
Figure 1B:
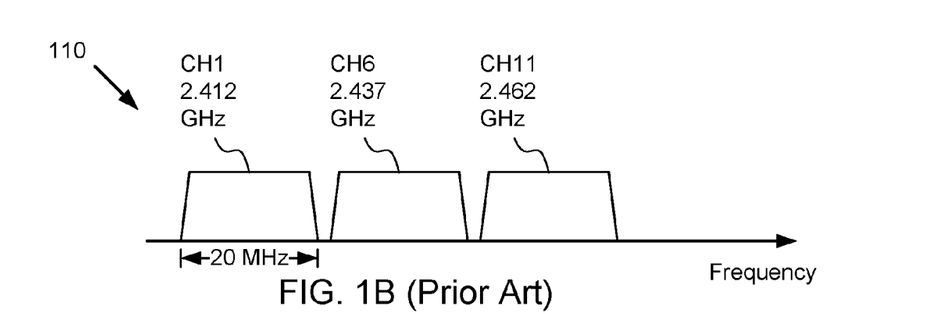
Figure 1C:
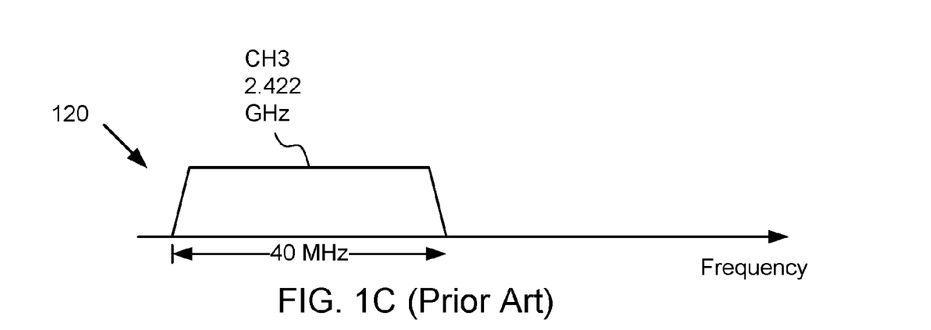
Figure 1D:
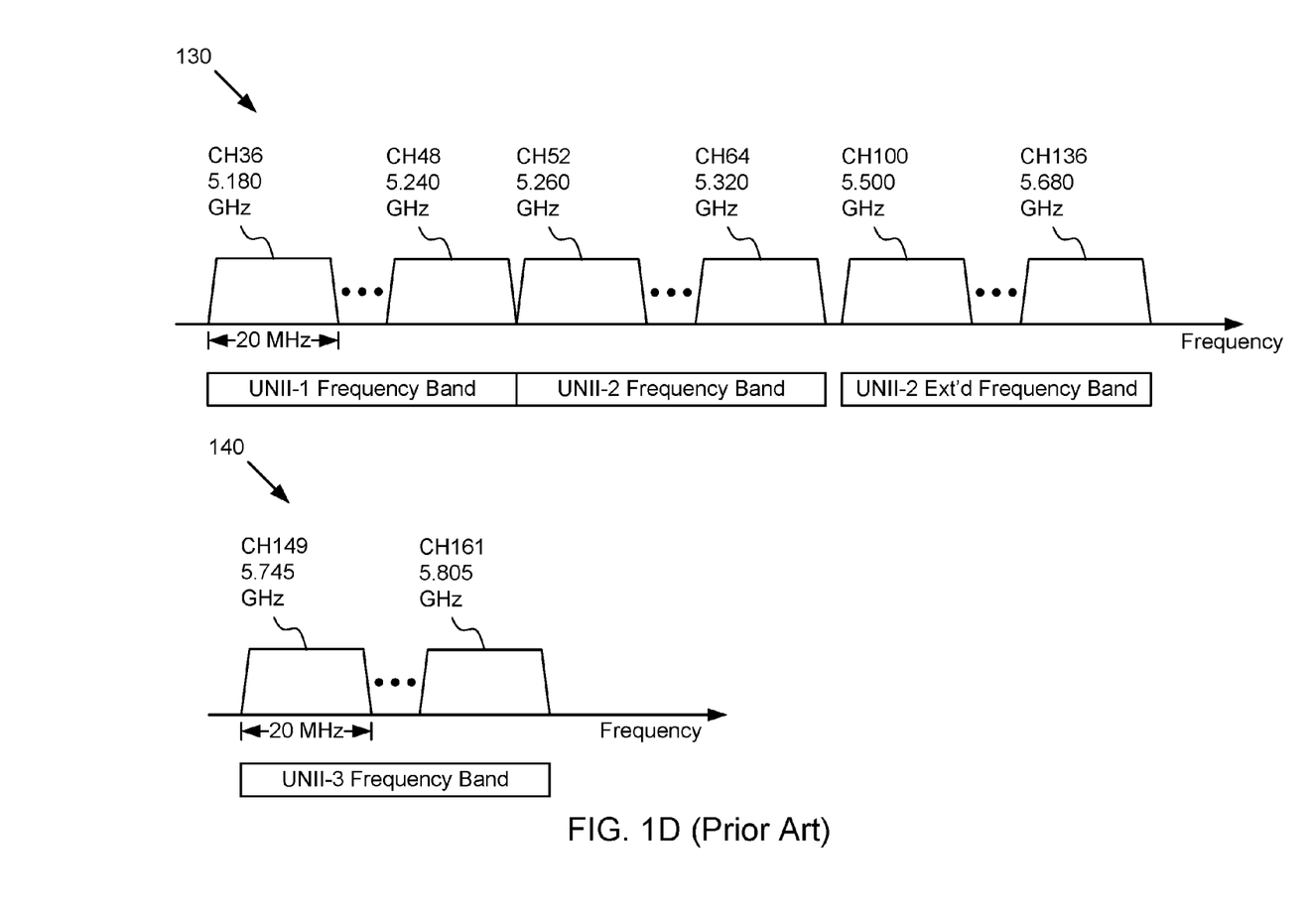
Figure 1E:
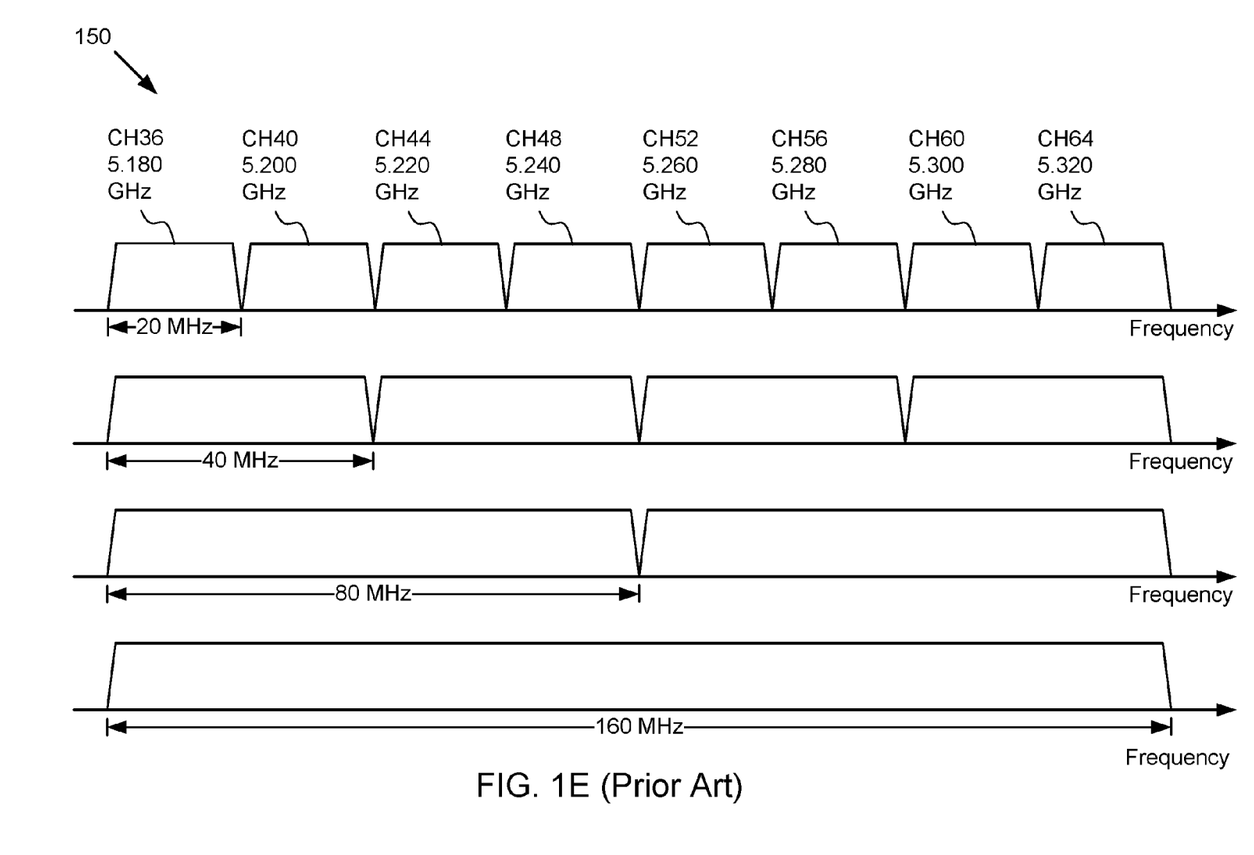

FIG. 1A to 1E illustrate a set of radio frequency channels available for use by wireless local area network (WLAN) systems in accordance with some embodiments. A wireless communication system, which can include a set of client devices, which can also be referred to as stations, client wireless devices, or client wireless communication devices, interconnected to an access point (AP). The client devices can be any wireless communication capable of communicating via a wireless local area network (WLAN) technology, e.g., in accordance with a wireless local area network communication protocol. In some embodiments, the WLAN technology can include a Wi-Fi (or more generically a WLAN) wireless communication subsystem or radio, the Wi-Fi radio can implement an Institute of Electrical and Electronics Engineers (IEEE) 802.11 technology, such as one or more of: IEEE 802.11a; IEEE 802.11b; IEEE 802.11g; IEEE 802.11-2007; IEEE 802.11n; IEEE 802.11-2012; IEEE 802.11ac; or other present or future developed IEEE 802.11 technologies. The set of 802.11 Wi-Fi communication protocols utilize radio frequency spectrum in the Industrial, Scientific, and Medical (ISM) radio frequency bands, e.g., 2.4 to 2.5 GHz, as well as the "5 GHz" radio frequency band, e.g., spanning from approximately 4.9 to 5.8 GHz. The "higher" radio frequency bands can provide for wider radio frequency channels that offer more bandwidth and higher data rates. The "lower" radio frequency bands can provide a wider coverage area due to lower path loss and therefore greater range. Typically, WLAN client devices and WLAN access points offer the capability to operate in one or both radio frequency bands. Additional radio frequency bands are planned for future use, and wireless communication protocol standards are being developed to use the additional radio frequency bands including those in the television "white space" frequencies, e.g. in the very high frequency (VHF) and ultra high frequency (UHF) bands, i.e., near 600 MHz, as well as at frequencies near 3.5 GHz. Radio frequency channels used by WLAN client devices and WLAN access points can span from approximately 20-22 MHz of radio frequency bandwidth, (e.g., as shown in FIG. 1A, FIG. 1B, FIG. 1D, and FIG. 1E), to 40 MHz of radio frequency bandwidth, (e.g., as shown in FIG. 1C and FIG. 1E), to 80 MHz and 160 MHz of radio frequency bandwidth, (e.g., as shown in FIG. 1E). Higher bandwidth radio frequency channels can provide for higher data rate throughput, but can also be subject to more radio frequency interference from other wireless systems, transmissions from which can overlap with all or a portion of the WLAN radio frequency channels.

Figure 2A:
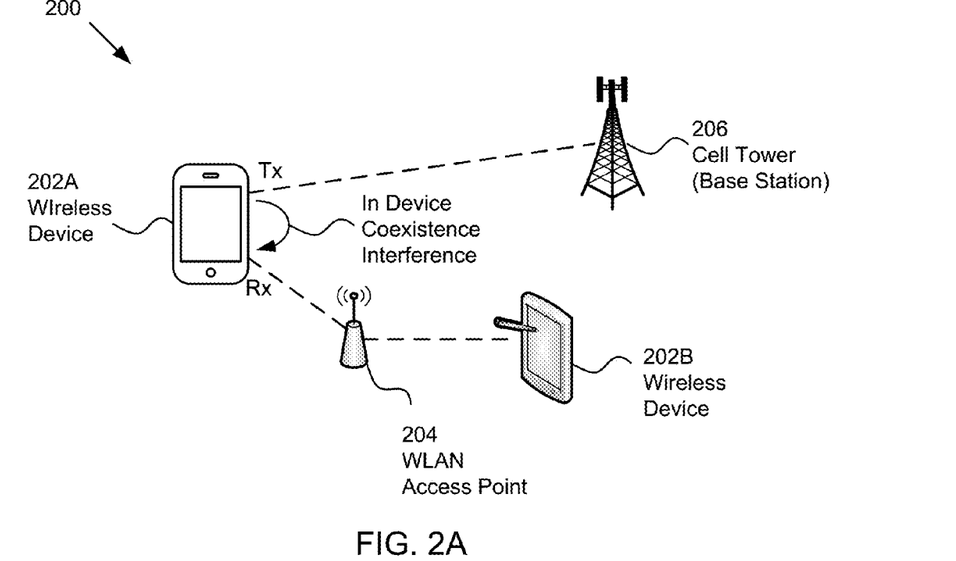
FIG. 2A to FIG. 2B illustrate representative wireless communication systems including radio frequency coexistence interference in accordance with some embodiments.

FIG. 2A illustrates a wireless communication system 200 in which a wireless communication device 202A can communicate simultaneously using a cellular wireless communication protocol, e.g., transmitting to a cell tower (base station) 206, while also receiving from a WLAN access point 204. The WLAN access point 204, and the wireless devices 202A and 202B can form a WLAN that use a particular radio frequency channel. When the wireless device 202A transmits on the same radio frequency channel or on a radio frequency channel that overlaps with the WLAN radio frequency channel, the receiver of the wireless device 202A can encounter "in device" coexistence radio frequency interference. As the cellular transmitter and the WLAN receiver can be collocated in the wireless device 202A, in some embodiments, the WLAN receiver and/or the cellular transmitter can undertake actions to mitigate effects of the "in device" coexistence radio frequency interference, e.g., by minimizing an overlap time to provide for reduced radio frequency interference from the cellular transmitter into the WLAN receiver. Radio frequency interference, however, can also occur between two different wireless devices or from access network equipment of a cellular wireless network (e.g., communicating with the same wireless device 202B as the WLAN 204) as illustrated by the wireless communication system 210 in FIG. 2B. A cellular transmitter of a nearby wireless device 202A can not only interfere with its own WLAN receiver but also with the WLAN receiver of another wireless device, e.g., wireless device 202B, which can seek to communicate with the WLAN access point 204 using the same and/or overlapping radio frequency channels as occupied by the cellular transmitter of the wireless device 202A. Similarly, a cellular transmitter of a cell tower (base station) 206 that communicates with one or more wireless devices, including for example the wireless device 202B, can cause coexistence interference in the wireless device 202B, which can seek to communicate with the WLAN access point 204 using the same and/or overlapping radio frequency channels as used by the cellular transmitter of the cell tower (base station) 206. In some embodiments, the wireless device 202B can seek to receive signals from both a WLAN access point 204 and from a cell tower (base station) 206 of a cellular wireless network. When both the WLAN access point 204 and the cell tower (base station) 206 use the same radio frequency channel and/or one or more overlapping radio frequency channels, e.g., in an unlicensed radio frequency band, reception by the wireless device 202B of signals from the WLAN access point 204 and/or from the cell tower 206 (e.g., using separate parallel wireless circuitry) can interfere with each other. As described further herein, the receiver of the wireless device 202B can listen for and detect radio frequency signals from nearby cellular transmitters, such as from the cell tower (base station) 206 that overlap and/or use the same radio frequency channels used for WLAN communication and can seek to minimize and/or mitigate the effect of detected radio frequency interference from the parallel, overlapping cellular transmissions.

Figure 2B:
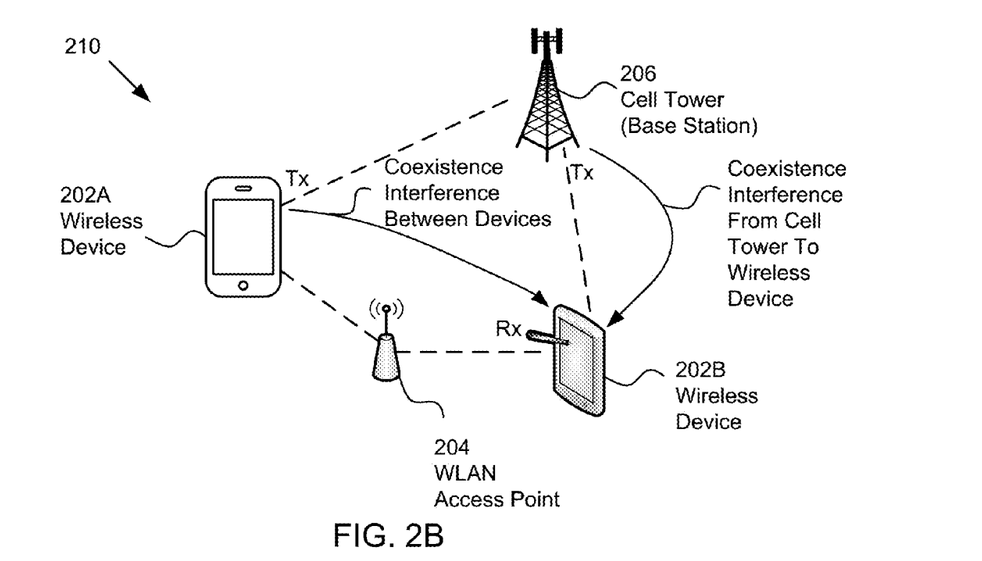

In a typical WLAN communication system, e.g., based on a carrier sense multiple access (CSMA) protocol, a wireless client device, e.g., 202A or 202B, can decode an incoming WLAN packet to determine its destination. As communication in the WLAN communication system can be "unscheduled," any incoming WLAN packet can be destined for the wireless client device 202A/B. In some embodiments, the wireless client device 202A/B can detect and decode the preamble of the WLAN packet, and by doing so, the wireless client device 202A/B can determine whether the radio frequency channel (which can also be referred to as the "medium") is occupied for communication by another WLAN client device. WLAN communication protocols can require that signals at a level of −82 dBm or higher be detectable and decodable by the WLAN client device 202A/B and by the WLAN access point 204 in order for a CSMA mechanism to perform properly. In a typical WLAN client device 202A/B, WLAN signals at a level of −90 dBm or higher can be detected and decoded. The detection and decoding, however, can rely on the presence of a preamble at the beginning of the WLAN packet for detection, and without the preamble, the WLAN client device 202A/B can rely instead on a simple energy detection mechanism to determine the presence of a radio frequency interferer.

The WLAN communication protocol can require that a radio signal having an energy level of −62 dBm or higher be detectable by the WLAN client device 202A/B. This detectable energy level is for radio frequency signals that may or may not be decodable and is substantially higher than the decodable level for formatted packets that include a preamble for detection. When detecting the energy of the interfering radio signal, which can also be referred to as measuring a received signal strength indication (RSSI) level of −62 dBm or higher, the WLAN client device 202A/B can acknowledge that the radio frequency channel is "busy" or otherwise "occupied" and can wait for a future "clear" transmission time. The WLAN client device 202A/B can thus "sense" the presence of a "carrier" in the radio frequency channel and provide for "fair" access to another WLAN device using the radio frequency channel. The energy detection mechanism, however, requires relatively high receive signal energy levels, while the preamble detection mechanism functions well at much lower received signal energy levels.

As LTE cellular systems do not use a preamble in a packet structure as used by the WLAN system, the WLAN client device 202A/B can be unable to detect and/or decode LTE signals that are transmitted in or overlapping a radio frequency channel that the WLAN client device 202A/B seeks to use. An LTE packet having a radio frequency signal energy level between −82 dBm and −62 dBm may be undetectable by the WLAN client device 202A/B using standard techniques, e.g., by using an energy detection mechanism, and both the LTE communication system and the WLAN communication system can be subject to radio frequency interference when they attempt to occupy the same radio frequency channel at the same time. Wireless packets for the LTE communication system and/or the WLAN communication system can be corrupted due to the radio frequency interference unless a proper detection and "back off" mechanism is employed.

In some embodiments, a WLAN client device 202A or 202B and/or a WLAN AP 204 can scan one or more radio frequency channels in a radio frequency band (or in multiple radio frequency bands) to detect the presence of an LTE cellular system. The WLAN device can collect a set of received radio frequency time domain signal samples, which can be asynchronous to the LTE cellular system's transmissions. In some embodiments, the WLAN device can "oversample" the received radio frequency signals by at least a factor of two to four compared with a sampling rate used for transmissions by the LTE cellular system. The WLAN device can collect the first set of radio frequency signal time domain samples over a sampling time window, which, in some embodiments, can span a time period used for a cyclic prefix of an orthogonal frequency division multiplexing (OFDM) symbol in the LTE cellular system. In some embodiments, the first set of radio frequency signal samples span a time period of at least 4.7 micro-seconds and/or 5.2 micro-seconds, which can correspond to a cyclic prefix length used for OFDM symbols of the LTE cellular system. The WLAN device can perform a cross-correlation of the first set of radio frequency signal samples with a second set of radio frequency signal samples spanning a correlation time period that is longer than the sampling time window. In some embodiments, the correlation time period spans a time period used for an OFDM symbol (excluding the cyclic prefix). This longer time period of the OFDM symbol can also be referred to as a "useful" OFDM symbol time period. The WLAN device can determine whether the cross-correlation of the first set of radio frequency signal samples with the second set of radio frequency signal samples produces two (or more) correlation peaks of a sufficiently high magnitude, e.g., above a threshold level. The WLAN device can also determine whether pairs of correlation peaks are separated by a time period of the OFDM symbol. The WLAN device can also determine whether a ratio of the second correlation peak to the first correlation peak exceeds a ratio threshold, e.g., to determine whether the magnitude of the second correlation peak equals or exceeds 90% of the magnitude of the first correlation peak. In some embodiments, the WLAN device can repeat collecting time domain samples and performing the cross-correlation over a time-shifted correlation time period until detection of the radio frequency interference occurs of a cumulative time shift of the time-shifted correlation time period exceeds a maximum correlation time period.

In a representative embodiment, two correlation peaks are separated by 66.7 micro-seconds, which corresponds to the time period of the OFDM symbol. (As would be understood by a person of ordinary skill, in some embodiments, the measured actual separation of the correlation peaks may vary slightly from the 66.7 micro-seconds indicated hereinabove due to time-domain sampling, timing loops, etc.) When two correlation peaks of sufficient magnitude and appropriate time separation are detected, the WLAN device can determine that an LTE cellular system is using the radio frequency channel on which the radio frequency signal samples were collected. In some embodiments, the WLAN device can undertake radio frequency interference mitigation techniques to limit radio frequency interference for WLAN communication, e.g., by selecting another radio frequency channel in which LTE cellular transmissions are not expected and/or known to occur, and/or by delaying transmission and/or reception of WLAN packets for a period of time. The WLAN device can undertake the correlation of the received radio frequency signal samples to detect the presence of an LTE cellular system interferer as part of a clear channel assessment or other similar procedure in which one or more radio frequency channels are evaluated by the WLAN device before a transmission time period and/or a reception time period, e.g., as part of a CSMA mechanism or other interference and/or collision detection mechanism used by the WLAN device to support multiple access.

When no two correlation peaks of sufficient magnitude or requisite time separation are determined, the WLAN device can repeat the cross-correlation using a new set of radio frequency signal samples, e.g., by sliding the first radio frequency signal set's sampling time window by a time offset, which can range from several time samples up to a cyclic prefix length, and repeating the cross-correlation. In an embodiment, the time offset corresponds to a time period of no more than one-half the length of a cyclic prefix. In some embodiments, the time offset of each successive sampling time window relative to a previous sampling time window is less than a length of the sampling time window. In some embodiments, the time offset is less than one-half the length of the sampling time window. In an embodiment, each sample set time window can span a time period expected for a cyclic prefix, e.g., 4.7 micro-seconds and/or 5.2 micro-seconds associated with OFDM symbols used for LTE cellular transmissions. As the WLAN device may not know when a cyclic prefix of the LTE cellular transmissions occurs, the WLAN device can repeatedly collect radio frequency signal samples that span a cyclic prefix length and repeat the cross-correlation to attempt to locate the cyclic prefix. When no two peaks having sufficient magnitude and time separation spacing are found after performing a cross-correlation using multiple sets of radio frequency signal samples that span a time period corresponding to at least one LTE OFDM symbol, the WLAN device can determine that the radio frequency channel is not occupied presently by an LTE cellular system (and/or the LTE cellular system is communicating at a level that is undetectable, e.g., relative to a noise floor of the WLAN device). As described hereinabove, the WLAN device samples received radio frequency signals for a radio frequency channel and performs a cross-correlation of the received radio frequency signal samples to detect the presence of a repeated pattern in the received samples (i.e., the presence of cyclic prefix of an OFDM symbol, the cyclic prefix repeating a portion of the OFDM symbol); however, the WLAN device is not required to decode the LTE OFDM symbols to detect the LTE OFDM symbols presence and potential interference in a commonly shared and/or overlapping radio frequency channel.

In some embodiments, when radio frequency interference is detected, the WLAN device can inhibit communication over a radio frequency channel on which radio frequency interference is detected for at least a period of time, e.g., a random length or fixed length back-off time period, or until determining that the radio frequency channel is free of radio frequency interference. In some embodiments, the WLAN device can maintain a record of radio frequency interference detection for a set of radio frequency channels in one or more radio frequency bands, e.g., by storing an indication of the presence and/or absence of radio frequency interference on a radio frequency channel. In some embodiments, the WLAN device can permit communication over a radio frequency channel previously indicated as having radio frequency interference when no radio frequency interference is detected.

Figure 3:
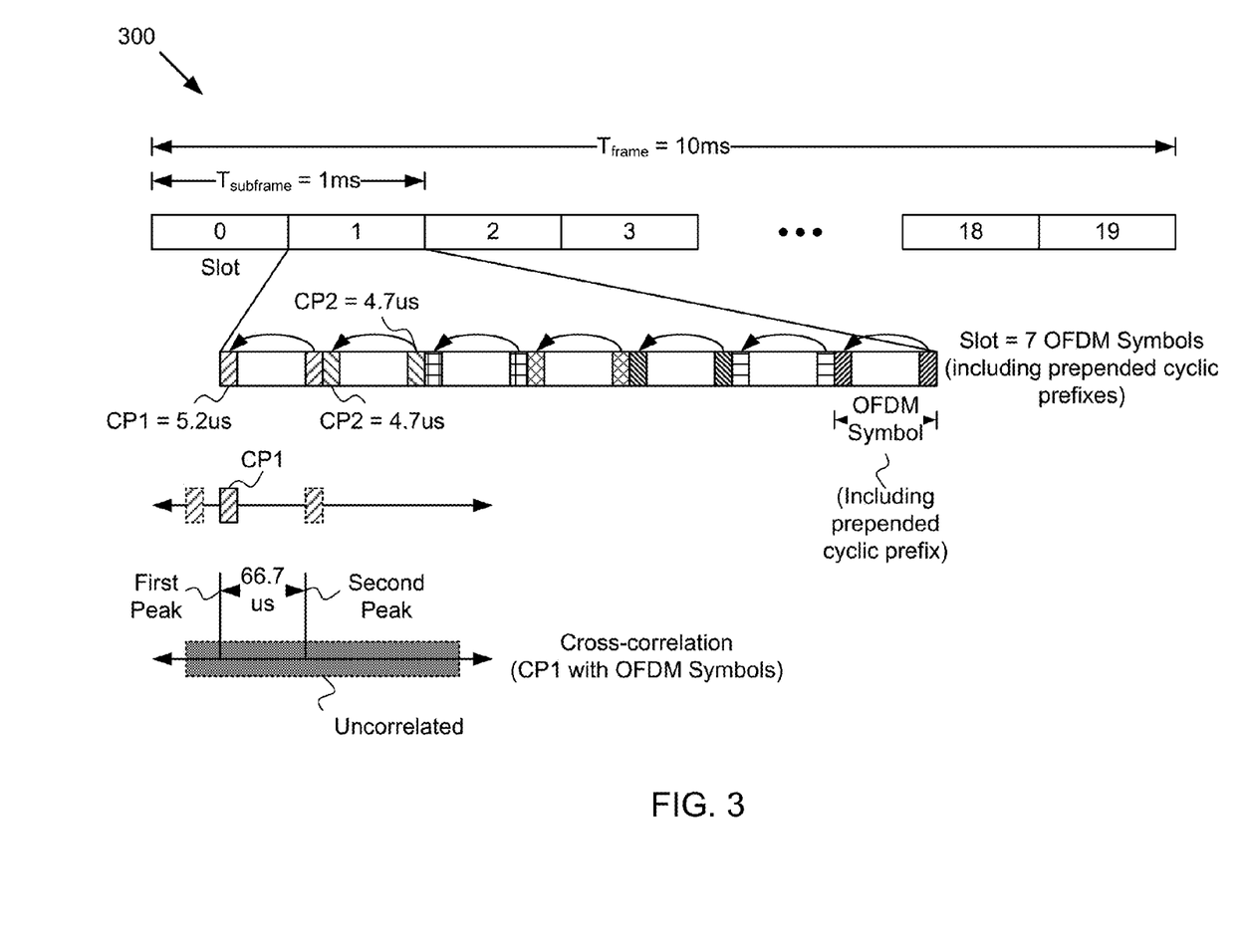
FIG. 3 illustrates a wireless communication protocol frame structure and a correlation profile in accordance with some embodiments.

FIG. 3 illustrates a representative frame structure 300 for an LTE cellular system. LTE frames can be organized into twenty consecutive time slots each spanning 0.5 ms to span a total of ten milliseconds (ms), with pairs of time slots forming one ms long sub-frames. Each 500 micro-second time slot can include seven OFDM symbols, with an tail portion of each OFDM symbol repeated before its corresponding OFDM symbol when transmitted, thereby forming a cyclic prefix that is appended to the beginning of the OFDM symbol. For the first OFDM symbol of a time slot, a cyclic prefix spanning 5.2 micro-seconds can be used, while for the second through seventh OFDM symbols of the time slot, a cyclic prefix spanning 4.7 micro-seconds can be used. As illustrated in FIG. 3, a cross-correlation of a cyclic prefix of an OFDM symbol, e.g., CP1 of the first OFDM symbol, with samples of a time period before and/or after the cyclic prefix, can be used to detect the presence of a repeated cyclic prefix pattern. The cyclic prefix can correlate with each of the two repeated versions of the cyclic prefix, i.e., the cyclic prefix that starts the OFDM symbol and the same repeated portion of the OFDM symbol that ends the OFDM symbol, and can be uncorrelated with the remaining (random data) samples of the OFDM symbol (or of the samples of the OFDM symbols including their cyclic prefix portions that precede and follow the OFDM symbol). Uncorrelated results can appear as "random noise", while the correlation of the cyclic prefix with itself can provide a peak value in the cross-correlation. (The correlation of the cyclic prefix with itself can also be considered a peak for an auto-correlation operation; however, the more general term cross-correlation is used herein to refer to the correlation of a sample time window, which can be of a cyclic prefix length, with a wider symbol time window, which can be of an OFDM symbol length.)

As the cyclic prefix appears at the beginning and at the end of an OFDM symbol separated by a time period corresponding to the length of the "useful" portion of the OFDM symbol, e.g., by 66.7 micro-seconds as shown in FIG. 3, the first and second peaks of the cross-correlation can also appear separated by 66.7 micro-seconds (i.e., by a time period that equals the length of the "useful" portion of the OFDM symbol). A WLAN device can collect a set of radio frequency signal samples that span a time period equal to at least the length of a cyclic prefix and can perform a cross-correlation of the collected set of samples with radio frequency signal samples that precede and/or follow the collected set. The WLAN device can search for peaks in the cross-correlation results, and when located peaks have sufficient magnitude, e.g., compared to a peak threshold value, and a particular time separation between them, the WLAN device can determine that an LTE communication system shares the radio frequency channel on which the radio frequency signal samples are collected. The WLAN device can determine the presence of the LTE communication system without having to decode the LTE signals.

As the WLAN device can be unaware of the exact timing of the boundaries between OFDM symbols, the WLAN device can repeatedly collect a sample time period spanning a cyclic prefix length and perform the cross-correlation repeatedly until either detecting two peaks of cross-correlation that indicate the presence of the LTE communication system or determining that no LTE communication system presently occupies and/or overlaps with the radio frequency channel being sampled. The WLAN device can perform the cross-correlation for a time period that extends at least as long as an OFDM symbol, or for a time sufficient to ensure that at least one OFDM symbol and its "repeated" cyclic prefix should have been found if present, in some embodiments. When detecting a pair of cross-correlation peaks that exceed a peak threshold value and are spaced apart by the OFDM symbol time period, the WLAN device can repeat the cross-correlation in a subsequent time period to confirm positions of the OFDM symbol boundaries, e.g., by detecting the repeated presence of cyclic prefixes in each of one or more additional OFDM symbol time periods. In some embodiments, the WLAN device compares a second peak value with a first peak value to determine whether the ratio of the first and second peak values exceeds a ratio threshold value. In a representative embodiment, the ratio threshold value is selected to be at or above 0.8. In some embodiments, the peaks of the correlation are compared with a power threshold level, which can be normalized, to determine whether the peak exceeds a "background" average "uncorrelated" noise/interference level, e.g., as indicated by correlation values other than the correlation peak values, such as by an average, mean, or range of correlation values that exclude the correlation peak values.

Figure 4:
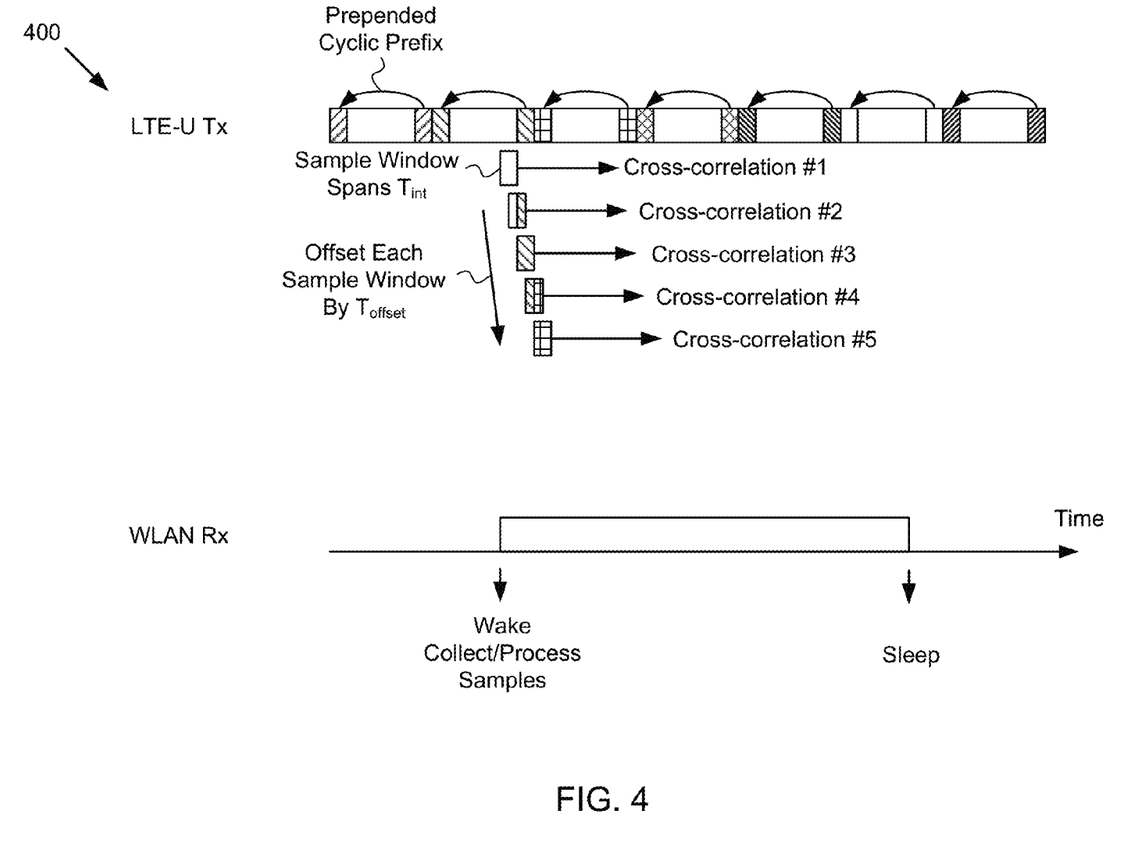
FIG. 4 illustrates a representative correlation method for radio frequency interference detection in accordance with some embodiments.

FIG. 4 illustrates a diagram 400, in which a WLAN device "wakes" to collect and process radio frequency signal samples through its receiver to determine whether an LTE communication system occupies and/or overlaps with a radio frequency channel on which the WLAN device may communicate. The WLAN device can operate "asynchronously" with respect to the LTE communication system, and thus upon waking, the WLAN device can collect a radio frequency signal sample window that spans a time interval of length $T_{int}$, which can overlap partially, fully, or not at all with a cyclic prefix of an OFDM symbol of a transmission of the LTE communication system. The WLAN device can be unaware of when an LTE OFDM symbol starts and ends, and thus the radio frequency signal sample window can collect a set of data from anywhere within one or more OFDM symbols. The time interval $T_{int}$ can span at least a time period corresponding to a cyclic prefix for an OFDM symbol of the LTE communication system. When the WLAN device collects a radio frequency signal sample window of data that does not include the cyclic prefix, then a second cross-correlation peak may not appear. (When the set of radio frequency signal samples, with which the "cyclic prefix length" set of radio frequency signal samples is correlated, includes the "cyclic prefix length" set, at least one cross-correlation peak can necessarily occur, namely for the "cyclic prefix length" set of radio frequency signal samples themselves.)

As illustrated in FIG. 4, cross-correlation #1 can be performed by using a radio frequency signal sample window of length $T_{int}$ that does not include a cyclic prefix, in which case two peaks of sufficient magnitude and separated by the required time period may not appear in the cross-correlation results. The WLAN device can subsequently offset the radio frequency signal sample window by an offset time period of $T_{offset}$ and repeat the cross-correlation. In some embodiments, the offset time period $T_{offset}$ is equal to or less than the sample window length $T_{int}$. The Cross-correlation #2 can be performed using a radio frequency signal sample window that partially spans a set of data used for a cyclic prefix at the beginning of an OFDM symbol before the WLAN device woke up. As such, cross-correlation #2 can also not result in detecting two peaks, as the corresponding repeated cyclic prefix occurs in the past (i.e., at a time before the WLAN device awoke to collect the radio frequency signal sample window). Cross-correlation #3 can be performed using a radio frequency signal sample window that fully spans a set of data used for a cyclic prefix; however, the corresponding cyclic prefix repetition (at the beginning of the OFDM symbol) can be from an earlier time period, and thus cross-correlation #3 can also not result in detecting two cross-correlation peaks. Cross-correlation #4 can be performed using a set of data that spans a trailing portion of a first OFDM symbol and a starting portion of a second OFDM symbol. Cross-correlation #4 can result in a second peak that is of insufficient magnitude relative to a first peak, as only a portion of the radio frequency signal sample window covers the data used for the cyclic prefix of one of the OFDM symbols, while another portion of the radio frequency signal sample window covers data from a preceding OFDM symbol. Cross-correlation #5 illustrates a time window that overlaps fully a set of data for a cyclic prefix of an OFDM symbol and can provide two peaks in the cross-correlation results. When the received signal strength of the LTE signal is sufficiently high relative to a noise floor (and/or to other noise received by the WLAN device, and/or to a "base" level determined using "off peak" cross-correlation results), the two cross-correlation peaks can be detected to have sufficient magnitude and separated by a time period corresponding to the OFDM symbol length (excluding the time added for the cyclic prefix), e.g., equal to the OFDM symbol length. When two cross-correlation peaks of an OFDM symbol are detected, the WLAN device can repeat the cross-correlation for one or more additional following OFDM symbols to confirm that the same pattern of cross-correlation peaks with the required magnitude (above a threshold level) and time separation occurs. When no pairs of peaks in the cross-correlation are detected after repeatedly attempting cross-correlation using at least two different radio frequency signal sample windows, the WLAN device can return to sleep and/or determine that the radio frequency channel that was sampled does not include interference from an LTE system.

Wireless communication systems can be subject to widely variable channel characteristics, and in some embodiments, the WLAN device can account for channel variation when determining the presence of radio frequency interference from an LTE system. The radio frequency channel can include a delay power profile that results in "dispersion" of the radio frequency signals, including the cyclic prefix of the LTE system. As such, in some instances, the cyclic prefix samples of the LTE system, when received by the WLAN device, can be spread over a time interval greater than the width of the cyclic prefix length, i.e., extended by the delay spread introduced by the radio frequency channel conditions. Cross-correlation of the "spread" cyclic prefix can result in multiple instances of pairs of peaks across one or more time shifts adjacent to one another. The WLAN device, in some embodiments, can determine whether two sets of peaks in the cross-correlation operation occur spaced apart by a time period corresponding to an OFDM symbol, e.g., by 66.7 micro-seconds separation. When noise and/or interference (from other than the LTE signals) is too high, the processing gain provided by the cross-correlation can be insufficient to allow the peaks of the cyclic prefix correlation to be detected. For a representative WLAN system, when the average signal to interference plus noise ratio (SINR) equals or exceeds approximately 10 dB, which can correspond to an LTE received signal power level of approximately −85 dBm, two peaks of cross-correlation can be detected for a radio frequency channel that spans a bandwidth of approximately 20-22 MHz.

In a representative WLAN system, OFDM sub-carrier frequency spacing spans approximately 312.5 kHz, while in a representative LTE system, OFDM sub-carrier frequency spacing spans approximately 15 kHz, and thus, each LTE OFDM symbol spans a time period approximately equal to twenty WLAN OFDM symbols. Using an oversampling rate of approximately two to four in the WLAN system's receiver front end can provide sufficient resolution for the cross-correlation of the LTE samples. Detection of the LTE system by the WLAN system can require a time period spanning at least one LTE OFDM symbol period, and can require multiple LTE OFDM symbol periods to confirm the presence of the LTE system, e.g., up to one LTE time slot spanning multiple LTE OFDM symbols. The methods and apparatus described herein do not require the WLAN device to decode LTE signals, but rather to detect the presence of a cyclic prefix of a particular length and having a spacing between copies of the cyclic prefix as used by OFDM symbols in an LTE system. The same wireless circuitry used to receive WLAN signals can also be used to sample the LTE signals, and cross-correlation of the received radio frequency signal samples can be performed in digital hardware. In some embodiments, the cross-correlation is performed at least in part by wireless baseband circuitry. In some embodiments, the cross-correlation is performed at least in part by a digital hardware block. In some embodiments, the cross-correlation of the radio frequency signal samples for different time shifts of the radio frequency signal sample window is performed at least in part serially. In some embodiments, the cross-correlation of the radio frequency signal samples for different time shifts of the radio frequency sample window is performed at least in part in parallel, e.g., using a correlation filter bank.

Figure 5:
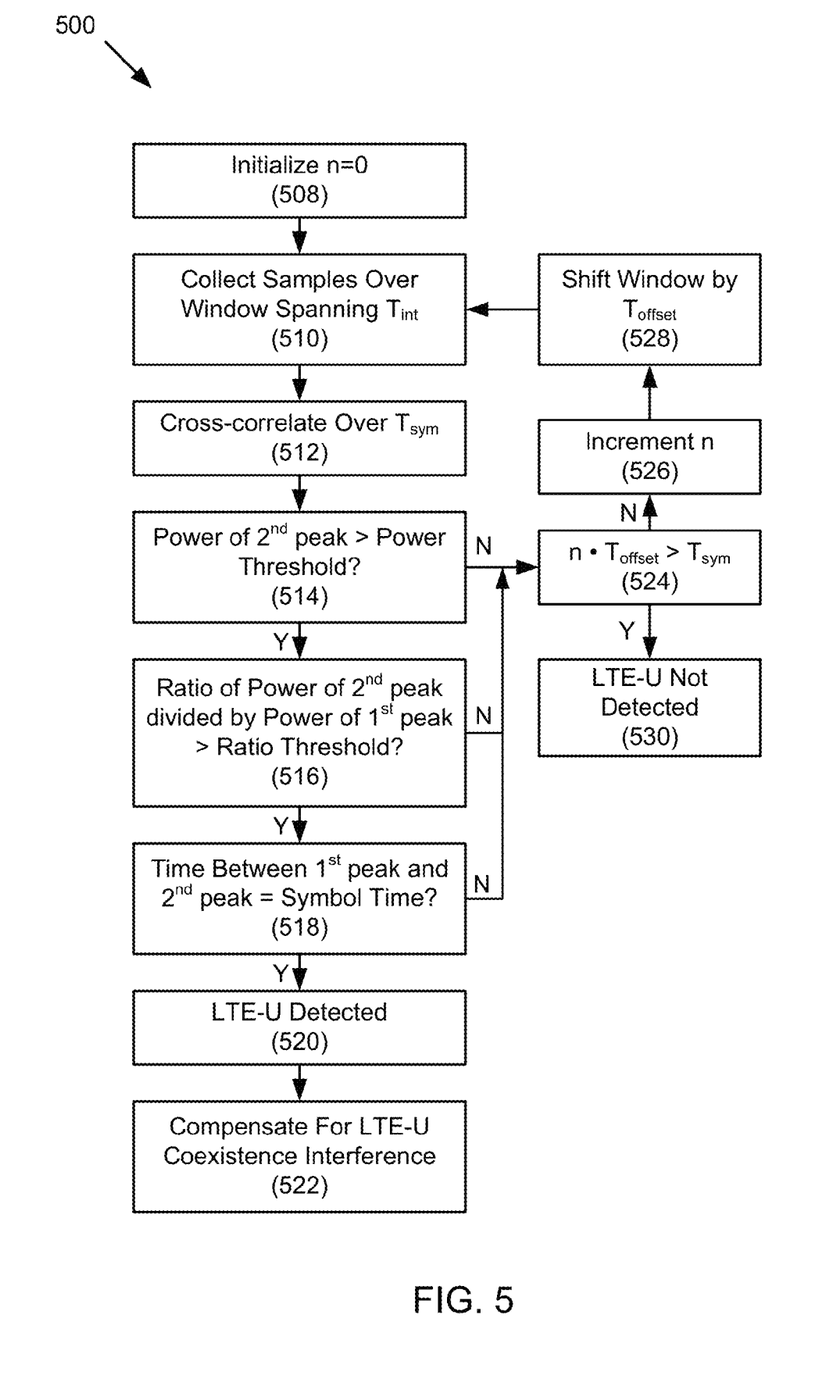
FIG. 5 illustrates a flow chart of a representative method to detect radio frequency interference in accordance with some embodiments.

FIG. 5 illustrates a flow chart 500 of a representative method to detect radio frequency interference from an LTE wireless communication system by a WLAN wireless communication system, in accordance with some embodiments. In a first step 508, a WLAN device, e.g., a WLAN client device and/or a WLAN access point, initializes a variable n to a value of zero, which can correspond to an initial sample window with a zero offset value. In a subsequent step 510, a receiver of the WLAN device can collect a first set of time domain radio frequency signal samples over a time window spanning a time interval $T_{int}$. In some embodiments, the first set of time domain radio frequency signal samples is collected for a radio frequency channel associated with communication used by the WLAN device, e.g., when the WLAN device is already associated with another WLAN device using the radio frequency channel. In some embodiments, the first set of time domain radio frequency signal samples is collected for a radio frequency channel on which communication by the WLAN device is expected to occur, e.g., for a future communication and/or when searching for a radio frequency channel on which to communicate. In some embodiments, the first set of time domain radio frequency signal samples is collected for a radio frequency channel as part of a radio frequency scanning process. In a representative embodiment, the time interval $T_{int}$ of the WLAN time window spans a time period corresponding to a cyclic prefix for an OFDM symbol of an LTE wireless communication system. In some embodiments, a value for the time interval $T_{int}$ ranges from 4.5 to 5.5 micro-seconds. In some embodiments, a value for the time interval $T_{int}$ is approximately 4.7 micro-seconds and/or 5.4 micro-seconds. In some embodiments, a value for the time interval $T_{int}$ is at least equal to a cyclic prefix length for the OFDM symbol of the LTE wireless communication system. In step 512, the WLAN device performs a cross-correlation of the first set of collected radio frequency signal samples of the time window with a second set radio frequency signal samples received over a time period $T_{sym}$ spanning at least one OFDM symbol for the LTE wireless communication system. In some embodiments, a value for the time period $T_{sym}$ equals or exceeds 66.7 micro-seconds. In some embodiments, the second set of radio frequency signal samples includes at least a portion of the first set of radio frequency signal samples. In some embodiments, the second set of radio frequency signal samples includes at least all of the first set of radio frequency signal samples. In step 514, the WLAN device compares cross-correlation values to determine whether a second cross-correlation peak occurs that exceeds a power threshold level. (A first cross-correlation peak can necessarily occur when correlating the first set of radio frequency signal samples with itself as part of the second set of radio frequency signal samples that span the wider time period $T_{sym}$ can overlap the first set of radio frequency signal samples.) When no second cross-correlation peak occurs, the WLAN device proceeds to step 524 to determine whether the set of cross-correlations completed exceeds the time period $T_{sym}$ spanning at least one OFDM symbol for the LTE wireless communication system. In step 524, the WLAN device determines whether sample windows spanning at least one entire OFDM symbol time period have been used for cross-correlation. When the WLAN device determines that at least an entire OFDM symbol time period has been checked and no pairs of cross-correlation peaks detected, then in step 530, the WLAN device can determine that no LTE wireless communication system is presently occupying the radio frequency channel being sampled. When less than one entire OFDM symbol time period has been used for cross-correlation, the WLAN device, in step 526 increments the variable n, and in step 528, the WLAN device shifts the radio frequency signal sample window by a time period of $T_{offset}$. In some embodiments, the time period $T_{offset}$ corresponds to a time period of at least one LTE sample. In some embodiments, the time period $T_{offset}$ is equal to or less than a time period spanned by a cyclic prefix of the LTE system. In some embodiments $T_{offset} \leq T_{int}$. The WLAN device repeats steps 510 to 514, when no second cross-correlation peak exceeds the power threshold, by "sliding" the radio frequency signal sample window of the set of radio frequency signal samples used for the cross-correlation by the offset time period and repeating the cross-correlation. When a second cross-correlation peak exceeds the power threshold, as determined in step 514, the WLAN device determines whether a ratio of a power level of the cross-correlation for the second cross-correlation peak over the power level of the cross-correlation for the first cross-correlation peak exceeds a ratio threshold in step 516. In some embodiments, a power level value of the second cross-correlation peak must equal or exceed at least 80% of a measured power level value of the first cross-correlation peak. When the ratio does not exceed the ratio threshold, the WLAN device can proceed to step 524. When the ratio does exceed the ratio threshold, the WLAN device can determine, in step 518, whether a time separation between the first cross-correlation peak and the second cross-correlation peak corresponds to a time period of an OFDM symbol for an LTE wireless communication system. When the time period between the cross-correlation peaks does not equal the OFDM symbol time, e.g., $T_{sym}$=66.7 micro-seconds, the WLAN device can proceed to step 524. When the time period between the cross-correlation peaks does equal the OFDM symbol time, the WLAN device, in step 520, can detect that an LTE wireless communication system transmitted in the radio frequency channel that was sampled. In step 522, the WLAN device can compensate for the presence of radio frequency coexistence interference from the LTE wireless communication system. In some embodiments, the WLAN device avoids the radio frequency channel on which the LTE wireless communication system is detected, e.g., for a random or fixed period of time, or until a future scanning operation determines that the radio frequency channel is free from radio frequency coexistence interference from an LTE wireless communication system. For example, in some embodiments, the method illustrated in FIG. 5 can be performed as part of a "clear" radio frequency channel assessment (CCA) within a carrier sense multiple access (CSMA) protocol executed by the WLAN device. In some embodiments, when the WLAN device has one or more data packets to transmit, the WLAN device can perform the CCA, which can include steps as outlined in FIG. 5. When the radio frequency channel assessed by the WLAN device is not occupied, e.g., as indicated at step 530 in FIG. 5, the WLAN device can transmit all or a portion of the one or more data packets. When the radio frequency channel assessed by the WLAN device is occupied, e.g., as indicated at step 520 in FIG. 5, the WLAN device can postpone transmission of the one or more packets (for a random or fixed period of time), e.g., in accordance with a CSMA protocol and/or as part of a clear channel assessment (CCA) procedure. In some embodiments, the WLAN device marks the radio frequency channel as occupied, and selects another radio frequency channel in the same radio frequency band or within a different radio frequency band for communication with other WLAN devices. This may also include, in some embodiments, the WLAN device transmitting a Channel Switch Announcement (CSA) action frame that indicates to which selected radio frequency channel the WLAN device plans to move.

Figure 6:
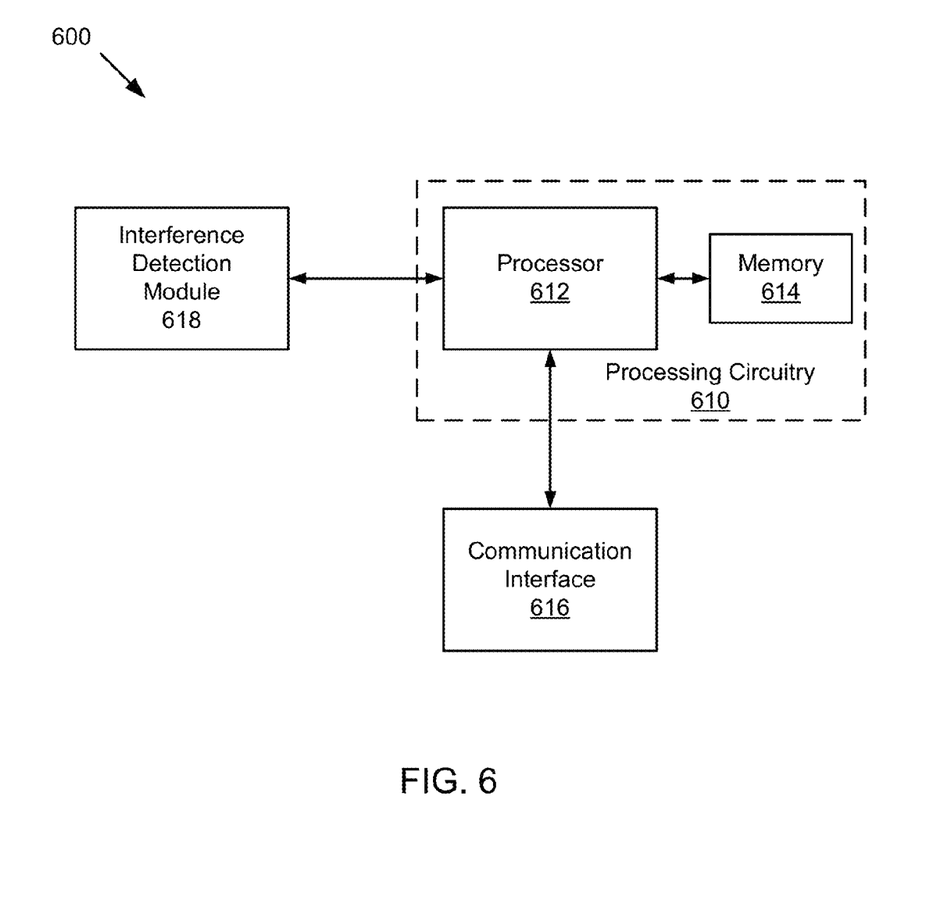
FIG. 6 illustrates a representative set of components included in a wireless communication device to detect radio frequency interference in accordance with some embodiments.

FIG. 6 illustrates a block diagram of an apparatus 600 that can be implemented on a WLAN client device and/or access point, in accordance with some embodiments. It will be appreciated that the components, devices or elements illustrated in and described with respect to FIG. 6 may not be mandatory and thus some may be omitted in certain embodiments. Additionally, some embodiments can include further or different components, devices or elements beyond those illustrated in and described with respect to FIG. 6. Further, it will be appreciated that, in some embodiments, one or more components of the apparatus 600 can be distributed across a plurality of computing devices that can collectively provide the functionality of a WLAN client device and/or WLAN access point to detect the presence of an LTE system in a radio frequency channel of a radio frequency band, e.g., in an unlicensed band, which can be shared among multiple wireless communication devices.

In some embodiments, the apparatus 600 can include processing circuitry 610 that is configurable to perform actions in accordance with one or more embodiments disclosed herein. In this regard, the processing circuitry 610 can be configured to perform and/or control performance of one or more functionalities of the apparatus 600 in accordance with various embodiments, and thus can provide means for performing functionalities of the apparatus 600 in accordance with various embodiments. The processing circuitry 610 can be configured to perform data processing, application execution and/or other processing and management services according to one or more embodiments.

In some embodiments, the apparatus 600 or a portion(s) or component(s) thereof, such as the processing circuitry 610, can include one or more chipsets, which can each include one or more chips. The processing circuitry 610 and/or one or more further components of the apparatus 600 can therefore, in some instances, be configured to implement an embodiment on a chipset comprising one or more chips. In some embodiments in which one or more components of the apparatus 600 are embodied as a chipset, the chipset can be capable of enabling a computing device(s) to operate as a WLAN client device and/or WLAN access point when implemented on or otherwise operably coupled to the computing device(s).

In some embodiments, the processing circuitry 610 can include a processor 612 and, in some embodiments, such as that illustrated in FIG. 6, can further include memory 614. The processing circuitry 610 can be in communication with or otherwise control a communication interface 616 and/or interference detection module 618.

The processor 612 can be embodied in a variety of forms. For example, the processor 612 can be embodied as various processing hardware-based means such as a microprocessor, a coprocessor, a controller or various other computing or processing devices including integrated circuits such as, for example, an ASIC (application specific integrated circuit), an FPGA (field programmable gate array), some combination thereof, or the like. Although illustrated as a single processor, it will be appreciated that the processor 612 can comprise a plurality of processors. The plurality of processors can be in operative communication with each other and can be collectively configured to perform one or more functionalities of the apparatus 600 as described herein. In embodiments including a plurality of processors, the plurality of processors can be implemented on a single computing device, or can be distributed across a plurality of computing devices that can collectively provide functionality of a WLAN client device and/or a WLAN access point that includes radio frequency interference detection of LTE communication systems. In some embodiments, the processor 612 can be configured to execute instructions that can be stored in the memory 614 or that can be otherwise accessible to the processor 612. As such, whether configured by hardware or by a combination of hardware and software, the processor 612 can be capable of performing operations according to various embodiments while configured accordingly.

In some embodiments, the memory 614 can include one or more memory devices. Memory 614 can include fixed and/or removable memory devices. In some embodiments, the memory 614 can provide a non-transitory computer-readable storage medium that can store computer program instructions that can be executed by the processor 612. In this regard, the memory 614 can be configured to store information, data, applications, instructions and/or the like for enabling the apparatus 600 to carry out various functions in accordance with one or more example embodiments. In embodiments including a plurality of memory devices, the plurality of memory devices can be implemented on a single computing device, or can be distributed across a plurality of computing devices that can collectively provide functionality of a WLAN client device or a WLAN access point to perform radio frequency interference detection and/or mitigation. In some embodiments, the memory 614 can be in communication with one or more of the processor 612, communication interface 616, or interference detection module 618 via one or more busses for passing information among components of the apparatus 600.

The apparatus 600 can further include communication interface 616. The communication interface 616 can include one or more interface mechanisms for enabling communication with other devices and/or networks. For example, the communication interface 616 can be configured to enable the apparatus 600 to communicate over a WLAN. The apparatus 600 can include multiple communication interfaces 616, which can each provide communication in accordance with a communication protocol, e.g., a wireless communication protocol. In various example embodiments, the communication interface 616 can include, for example, an antenna (or multiple antennas) and supporting hardware and/or software for enabling communications with one or more wireless communication networks, such as a cellular network, and/or a communication modem or other hardware/software for supporting communication via cable, digital subscriber line (DSL), USB, FireWire, Ethernet or other wire-line networking methods.

The apparatus 600 can further include an interference detection module 618. The interference detection module 618 can be embodied as various means, such as circuitry, hardware, a computer program product comprising computer readable program instructions stored on a non-transitory computer readable medium (for example, the memory 614) and executed by a processing device (for example, the processor 612), or some combination thereof. In some embodiments, the processor 612 (or the processing circuitry 610) can include, or otherwise control the interference detection module 618. The interference detection module 618 can be configured to support detection of radio frequency interference from LTE communication systems as described herein, and/or other functions that can be performed by a WLAN client device and/or WLAN access point in support of one or more example embodiments.

The various aspects, embodiments, implementations or features of the described embodiments can be used separately or in any combination. Various aspects of the described embodiments can be implemented by software, hardware or a combination of hardware and software. The described embodiments can also be embodied as computer readable code on non-transitory a computer readable medium. The non-transitory computer readable medium is any data storage device that can store data, which can thereafter be read by a computer system. Examples of the computer readable medium include read-only memory, random-access memory, CD-ROMs, HDDs, DVDs, magnetic tape, and optical data storage devices.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

Representative applications of systems, methods, apparatuses, and computer program products according to the present disclosure are disclosed herein. These examples are being provided solely to add context and aid in the understanding of the described embodiments. It will thus be apparent to one skilled in the art that the described embodiments may be practiced without some or all of these specific details. In other instances, well known process steps have not been described in detail in order to avoid unnecessarily obscuring the described embodiments. Other applications are possible, such that the following examples should not be taken as limiting.

In the detailed description provided herein, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting; such that other embodiments may be used, and changes may be made without departing from the spirit and scope of the described embodiments.

What is claimed is:

1. A method to detect radio frequency interference of orthogonal frequency division multiplexing (OFDM) data symbols in a radio frequency channel by a wireless communication device, the method comprising:
   by the wireless communication device:
      collecting a first set of time domain samples over a sampling time window on the radio frequency channel;
      performing a cross-correlation of the first set of time domain samples with a second set of time domain samples received on the radio frequency channel, the second set of time domain samples spanning a correlation time period greater than the sampling time window; and
      when (i) a first correlation peak and a second correlation peak of the cross-correlation each exceed a power threshold, (ii) a ratio of the second correlation peak to the first correlation peak of the cross-correlation exceeds a ratio threshold, and (iii) a time between the second correlation peak and the first correlation peak of the cross-correlation corresponds to an OFDM data symbol period, detecting the radio frequency interference; and
      repeating the collecting and the cross-correlation over a time-shifted correlation time period until the radio frequency interference is detected or until a cumulative time shift of the time-shifted correlation time period exceeds a maximum correlation time period, wherein the radio frequency interference comprises interference from random OFDM data symbols from another wireless device operating in the radio frequency channel.

2. The method of claim 1, wherein the sampling time window spans a time period corresponding to a cyclic prefix of an orthogonal frequency division multiplexing (OFDM) symbol that comprises random data.

3. The method of claim 1, wherein:
the correlation time period corresponds to a symbol period for a random data OFDM symbol of a Long Term Evolution (LTE) or LTE-Advanced wireless communication system, and
the sampling time window spans a time period corresponding to a cyclic prefix for random data OFDM symbols of the LTE or LTE-Advanced wireless communication system.

4. The method of claim 1, wherein the wireless communication device operates in accordance with an 802.11 Wi-Fi wireless communication protocol, and the radio frequency interference that is detected is received from a cellular wireless communication system.

5. The method of claim 4, wherein the cellular wireless communication system operates in accordance with a Long Term Evolution (LTE) or LTE-Advanced wireless communication protocol.

6. The method of claim 1, wherein each successive sampling time window over which time domain samples are collected is time-shifted from a previous sampling time window by less than a length of the sampling time window.

7. The method of claim 1, further comprising:
when the radio frequency interference is detected over a particular sampling time window, repeating the collecting and the cross-correlation over at least one additional correlation time period that is time-shifted by one or more integer multiples of a length of the correlation time period to confirm the radio frequency interference.

8. The method of claim 1, further comprising:
when the radio frequency interference is detected, inhibit communication over the radio frequency channel for at least a first period of time.

9. The method of claim 1, further comprising:
when no radio frequency interference is detected and the wireless communication device previously inhibited communication on the radio frequency channel, permitting communication over the radio frequency channel for at least a second period of time.

10. The method of claim 1, wherein the radio frequency channel is one of a plurality of radio frequency channels of an unlicensed radio frequency band.

11. A wireless communication device configurable to detect radio frequency interference of orthogonal frequency division multiplexing (OFDM) data symbols in a radio frequency channel, the wireless communication device comprising:
at least one communication interface configurable to communicate using one or more radio frequency channels of an unlicensed radio frequency band;
processing circuitry comprising at least one processor communicatively coupled to a storage medium; and
an interference detection module configurable to cause the wireless communication device to detect the radio frequency interference by:
collecting a first set of time domain samples over a sampling time window from the radio frequency channel;

performing a cross-correlation of the first set of time domain samples with a second set of time domain samples received on the radio frequency channel, the second set of time domain samples spanning a correlation time period greater than the sampling time window; and
when a set of correlation conditions are satisfied including (i) a first correlation peak and a second correlation peak of the cross-correlation each exceed a power threshold, and (ii) a time between the second correlation peak and the first correlation peak of the cross-correlation corresponds to an OFDM data symbol period, detecting the radio frequency interference,
wherein the radio frequency interference comprises interference from random OFDM data symbols from another wireless device operating in the radio frequency channel.

12. The wireless communication device of claim 11, wherein the set of correlation conditions further include a ratio of the second correlation peak to the first correlation peak of the cross-correlation exceeds a ratio threshold.

13. The wireless communication device of claim 11, wherein the interference detection module further causes the wireless communication device to detect the radio frequency interference by:
when no radio frequency interference is detected over the sampling time window, repeating the collecting and the cross-correlation over a time-shifted correlation time period until the radio frequency interference is detected or until a cumulative time shift of the time-shifted correlation time period exceeds a maximum correlation time period.

14. The wireless communication device of claim 11, wherein the sampling time window spans a time period corresponding to a cyclic prefix of an OFDM symbol for a Long Term Evolution (LTE) or LTE-Advanced wireless communication system.

15. The wireless communication device of claim 11, wherein the correlation time period corresponds to a symbol period for a random data OFDM symbol of a Long Term Evolution (LTE) or LTE-Advanced wireless communication system.

16. The wireless communication device of claim 11, wherein the wireless device operates in accordance with an 802.11 Wi-Fi wireless communication protocol, and the radio frequency interference that is detected is received from a cellular wireless communication system that operates in accordance with a Long Term Evolution (LTE) or LTE-Advanced wireless communication protocol.

17. The wireless communication device of claim 11, wherein the interference detection module further causes the wireless communication device to confirm detection of the radio frequency interference by:
when the radio frequency interference is detected over a particular sampling time window, repeating the collecting and the cross-correlation over at least one additional correlation time period that is time-shifted by one or more integer multiples of a length of the correlation time period to confirm the radio frequency interference.

18. The wireless communication device of claim 11, wherein the storage medium stores instructions that, when executed by the processing circuitry, cause the wireless communication device to:
when the radio frequency interference is detected, inhibit communication over the radio frequency channel for at least a first period of time.

19. The wireless communication device of claim 11, wherein the storage medium stores instructions that, when executed by the processing circuitry, cause the wireless communication device to:

when no radio frequency interference is detected and the wireless communication device previously inhibited communication on the radio frequency channel, permitting communication over the radio frequency channel for at least a second period of time.

20. A non-transitory computer-readable medium storing instructions that, when executed by one or more processors of a wireless communication device, cause the wireless communication device to:

collect a first set of time domain samples over a sampling time window on a radio frequency channel of an unlicensed radio frequency band;

perform a cross-correlation of the first set of time domain samples with a second set of samples received on the radio frequency channel, the second set of samples spanning a correlation time period greater than the sampling time window; and when a set of correlation conditions are satisfied including (i) a first correlation peak and a second correlation peak of the cross-correlation each exceed a power threshold, and (ii) a time between the second correlation peak and the first correlation peak of the cross-correlation corresponds to an orthogonal frequency division multiplexing (OFDM) data symbol period for communication in accordance with a cellular wireless communication protocol, determine radio frequency interference exists in the radio frequency channel of the unlicensed radio frequency band, wherein the radio frequency interference comprises interference from random OFDM data symbols from another wireless device operating in the radio frequency channel.

* * * * *